US007679875B2

(12) United States Patent
Schneider

(10) Patent No.: US 7,679,875 B2
(45) Date of Patent: Mar. 16, 2010

(54) PROTECTIVE CIRCUITRY FOR PHOTOMULTIPLIER TUBES

(75) Inventor: Juergen Schneider, Sinsheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 190 days.

(21) Appl. No.: 12/021,672

(22) Filed: Jan. 29, 2008

(65) Prior Publication Data

US 2008/0180868 A1 Jul. 31, 2008

(30) Foreign Application Priority Data

Jan. 30, 2007 (DE) ....................... 10 2007 004 598

(51) Int. Cl.
*H02H 3/08* (2006.01)

(52) U.S. Cl. ........................................................ 361/87

(58) Field of Classification Search .................... 361/87
See application file for complete search history.

(56) References Cited

U.S. PATENT DOCUMENTS 3,694,659 A * 9/1972 Ramsay et al. ........ 250/214 VT
3,733,491 A * 5/1973 Holland, Jr. ................. 250/207
4,367,404 A * 1/1983 Kaye .......................... 250/207
4,436,994 A * 3/1984 Van Vliet et al. ............ 250/207
4,820,914 A * 4/1989 Allen .......................... 250/207
5,401,951 A * 3/1995 Butler et al. ................ 250/207
6,462,345 B1 * 10/2002 Simon et al. ............. 250/458.1
7,459,662 B1 * 12/2008 Gardner ....................... 250/207

FOREIGN PATENT DOCUMENTS

JP 03133046 A * 6/1991

* cited by examiner

*Primary Examiner*—Stephen W Jackson
*Assistant Examiner*—Ann T Hoang
(74) *Attorney, Agent, or Firm*—Crowell & Moring LLP

(57) ABSTRACT

An electronic circuit for protecting a photomultiplier against overloads is provided. The photomultiplier has a cathode, an anode, a plurality of dynodes and a voltage divider. The circuit includes a high-voltage source, which applies a high voltage to the photomultiplier. A protective switch is set up for preventing a current flow through the anode. A comparison device is configured for comparing a load signal characterizing the loading of the anode with a maximum load signal and for driving the protective switch in accordance with this comparison.

18 Claims, 3 Drawing Sheets

PROTECTIVE CIRCUITRY FOR PHOTOMULTIPLIER TUBES

CROSS-REFERENCE TO RELATED APPLICATION

This application claims the priority of German Application No. 10 2007 004 598.2, filed Jan. 30, 2007, the disclosure of which is expressly incorporated by reference herein.

FIELD OF THE INVENTION

The invention relates to an electronic circuit for protecting a photomultiplier against overloads. The invention furthermore relates to a scanning microscope for examining a sample, which has an electronic circuit according to the invention, inter alia, and also a method for protecting a photomultiplier against overloads.

BACKGROUND ART

Photomultipliers (also called PMT, photomultiplier tube) are electron tubes which amplify weak light signals (down to individual photons) and convert them into electrical signals. Besides individual photomultipliers, arrays of a plurality of photomultipliers can also be used.

Photomultipliers typically have one or a plurality of photocathodes, and also an anode and a plurality of dynodes arranged between the photocathode and the anode. The dynodes and the anode together form a so-called secondary electron multiplier, which is disposed downstream of the photocathode. The photocathode, the dynodes and the anode are usually connected to one another by way of a voltage divider with voltage divider resistors and/or other electronic components such as, for example, transistors or similar stabilizing elements.

Photons impinging on the photocathode have the effect that electrons are emitted from the surface of the cathode (photoemission, photoeffect). These photoelectrons are accelerated in the electric fields of the photomultiplier, and upon impinging on the dynodes generate further electrons until, finally, an electron cascade occurs at the anode. These charges are usually diverted from the anode, for example to ground, wherein this current signal (for example after conversion into a corresponding voltage signal) can be coupled out and utilized as the signal of the photomultiplier.

Typical photomultipliers operate with 10 dynodes. Customary gain factors lie within the range of $10^5$ to $10^7$.

Photomultipliers of this type are used for example as light detectors in modern microscopes such as, for example, optical scanning microscopes. By way of example, these may be fluorescent microscopes, for example microscopes in which a sample is scanned with an excitation beam by use of a scanning device. The sample is thereby excited locally to effect luminescence, wherein the luminescence photons are recorded by the photomultiplier or photomultipliers. As an alternative or in addition, it is also possible for example to detect light beams transmitted by the sample (transmitted-light microscopes). Other types of optical microscopes are also contemplated, however.

Particularly when used in microscopes, but also when used in other types of optical devices, photomultipliers are often faced with the problem of an overload. The overload arises as a result of a predetermined high voltage being applied to the photomultiplier usually by a high-voltage source. The high voltage, and thus the sensitivity of the photomultiplier, are chosen such that under the given light conditions, the anode (wherein a plurality of anodes may also be provided) of the photomultiplier is not overloaded by an excessively high current flow. Thus, a maximum current at which the anode is not yet damaged is usually provided. At currents which exceed the maximum current, damage to the anode can occur, for example as a result of thermal decomposition of the anode material.

Particularly when used in microscopes, however, it often happens that the photomultiplier is exposed to unexpected changes in the light conditions. In particular, these may be changes in the ambient light conditions. By way of example, a photomultiplier of this type can be used at a location in the housing of the microscope at which ambient light can penetrate unexpectedly (for example as a result of the housing being opened), which ambient light would then lead, in the case of the predetermined sensitivity, to an anode current exceeding the maximum current.

One possibility for protecting the photomultiplier would consist in utilizing the photomultiplier signal by way of a corresponding feedback in order to set the high-voltage supply of the photomultiplier to a lower sensitivity. By way of example, the high-voltage supply would be correspondingly reduced in this case. The problem, however, is that controls of this type in many cases have transient recovery times in the region of hundreds of microseconds up to the milliseconds range, which may already suffice to permanently damage the photomultiplier.

SUMMARY OF THE INVENTION

The present invention provides an electronic circuit which ensures an effective protection of a photomultiplier against overloads and which can, in particular, react rapidly to changes in the light conditions.

The present invention provides an electronic circuit for protecting a photomultiplier against overloads, wherein the photomultiplier has a cathode, an anode, a plurality of dynodes and a voltage divider. The circuit has a high-voltage source which applies a high voltage to the photomultiplier. A protective switch is provided, which is set up for preventing a current flow through the anode. A comparison device is furthermore provided, which is configured for comparing a load signal characterizing the loading of the anode with a maximum load signal and for driving the protective switch in accordance with this comparison. A method according to the present invention protects a photomultiplier against overloads, wherein the photomultiplier has a cathode, an anode, a plurality of dynodes and a voltage divider. A high voltage is applied to the photomultiplier by a high-voltage source, wherein a load signal characterizing the loading of the anode is compared with a maximum load signal. A current flow through the anode is prevented by use of a protective switch when the maximum load signal is exceeded. Advantageous developments of the invention are further described and claimed herein. These advantageous developments can be realized both individually and in combination with one another.

The electronic circuit can be used for a photomultiplier which, as described above, has a cathode, an anode, a plurality of dynodes and a voltage divider. In this case, cathode and anode can respectively be present both singly and multiply. The voltage divider can include, as described above, the voltage divider resistors and/or other electronic elements, for example transistors and/or stabilizing elements. Photomultipliers of this type are commercially available.

Furthermore, the circuit has a high-voltage source for applying a high voltage to the photomultiplier. In particular, this can be a controlled high-voltage source, that is to say a high-voltage source which is able to control a voltage and/or a current at its output. In particular, the high-voltage source should be configured in such a way that the high voltage can be set in order thereby to be able to set the sensitivity of the photomultiplier.

In order to protect the photomultiplier against overloads, a protective switch is used, which is set up for interrupting a current flow through the anode. By way of example, this can be a transistor switch driven by a corresponding voltage.

Furthermore, a comparison device is provided, by which a load signal which characterizes the loading of the anode is compared with a predetermined maximum load signal. In this case, the comparison device is set up for—if the load signal exceeds the maximum load signal—correspondingly driving the protective switch and thus preventing the current flow through the anode. In this case, the comparison circuit can be configured in such a way that if the load signal has subsequently decreased and fallen below the threshold of the maximum load signal again, the switch is closed again in order to enable the current flow through the anode again.

The driving of the protective switch by the comparison device can be effected directly (for example, by an output signal of the comparison device being forwarded directly to an input of the protective switch), or it is also possible for an intermediate circuit to be present, which modifies an output signal of the comparison device in order to subsequently be able to use the signal for driving the protective switch.

In contrast to the above-described control of the high-voltage source that is known from the prior art, preventing the current flow through the anode by way of the protective switch has the advantage that, with the use of suitable switches (such as, for example, a corresponding transistor circuit), it is possible to realize a turn-off in the range of a few tens to a few hundreds of microseconds. Damage to the photomultiplier can be avoided in this way. At the same time, however, the signal of the comparison device can still be used for controlling the high-voltage source in order to bring about, besides the fast turn-off, in parallel a slower adaptation of the sensitivity.

The protective switch can act for example on a reference potential of the voltage divider. Thus, by way of example, an end of the voltage divider that is opposite to the high-voltage source can be connected to ground potential via a reference line during normal operation, such that the entire high voltage is dropped across the voltage divider. If the connection via the reference line to ground is interrupted by the protective switch, then the voltage across the voltage divider collapses, and the current flowing through the entire photomultiplier (and thus also through the anode) is interrupted.

One possible development of the invention takes account of the fact that in the event of an interruption of the current flow through the anode, a considerable load change usually occurs at the high-voltage source. If the current flow is subsequently switched on again, then this can lead, on account of the slow control of the high-voltage source (hundreds of microseconds up to the milliseconds range), to the occurrence firstly of a transient recovery process before the high-voltage source settles reliably in terms of control. Such control times with correspondingly occurring oscillations in the high voltage can lead to intensity fluctuations in the image of the microscope. In the case of the control durations described, for example, an entire scanning image of a scanning microscope can be disturbed.

Therefore, one preferred development proposes interrupting the current flow indeed through the anode, but not the entire current flow provided by the high-voltage source. Accordingly, one of the dynodes between cathode and anode is defined as a diverting dynode according to the invention. This diverting dynode can provide a current bypass equipped with one or a plurality of bypass switches (for example, once again transistor switches) via which, upon actuation of the bypass switch, a current can be diverted from the diverting dynode whilst bypassing the anode. By way of example, 10 dynodes can be provided, wherein the third from last dynode is configured as a diverting dynode in order to divert a current from there to a ground upon actuation of the bypass switch.

In this case, the electronic circuit can preferably be configured in such a way that the switching of the protective switch (for example, an opening) and the switching of the bypass switch (for example, a closing) are effected in synchronized fashion. This synchronization is preferably effected in such a way that the switching is effected substantially simultaneously (for example with a time offset of less than 10 microseconds) or else with a predetermined temporal offset, for example a predetermined temporal offset in the region of a few tens of microseconds. The development of synchronized switching has the advantage that even in the event of an interruption of the current flow through the anode, a current can still flow, such that the high-voltage source does not have to be subjected to a considerable load change.

In order to reduce the load change further, the diverted current can preferably be diverted via at least one replacement load in the bypass. In this case, the replacement load can substantially correspond to the load which would be present between diverting dynode and anode. In this case, "substantially" should be understood to mean that the load change overall is preferably not more than 10 percent, particularly preferably not more than 5 percent, and ideally not more than 1 percent. In this way it is possible to virtually completely avoid a load change in the event of an interruption of the anode current, that is to say upon the triggering of the protective switch, such that no oscillations whatsoever, or only greatly reduced oscillations, occur at the high-voltage source. As a result, the image quality is considerably improved and intensity fluctuations in the image can be virtually completely avoided.

Further advantageous developments relate to the comparison device. Thus, the comparison device can include a comparator, in particular. Such comparators can be realized by corresponding transistor and/or operational amplifier circuits, wherein the use of fast operational amplifiers is possible. In this way it is possible to realize comparison devices whose reaction times lie within the range of a few tens of microseconds to a few hundreds of microseconds. Preferably, the correction times that can be achieved can be so short that they are no longer visible in the scanning image generated. The maximum load signal can then be predetermined by an adjustable voltage source, for example, the output signal which can be connected to an input of the comparator. In this way, it is possible to set the maximum load, for example in order to enable a change to another type of photomultiplier. Component tolerances can also be compensated for in this way.

Further advantageous developments relate to the load signal which characterizes the loading of the anode. The load signal could be generated for example by an external detector, for example a detector which observes the external light conditions and supplies a corresponding signal to the comparison device. In this case, photodiodes could be used, for example, or else further photomultipliers. Other types of detectors can also be used, for example infrared detectors which register a thermal loading of the anode.

It is particularly preferred, however, to derive the load signal from an output signal of the photomultiplier. In this case, the output signal of the photomultiplier (that is to say a current signal and/or a voltage signal derived from the current signal) can be used as an input signal of the comparison device directly or after interposition of further electronics (for example amplification, filtering, etc). Such a circuit can be realized as a fast circuit since the direct use of the output signal of the photomultiplier obviates the use of additional electronic components which might corrupt and/or delay the signal.

Further details and features of the invention will become apparent from the following description of a preferred exemplary embodiment in conjunction with the claims. However, the invention is not restricted to the exemplary embodiment.

DETAILED DESCRIPTION OF THE DRAWINGS

Figure 1:
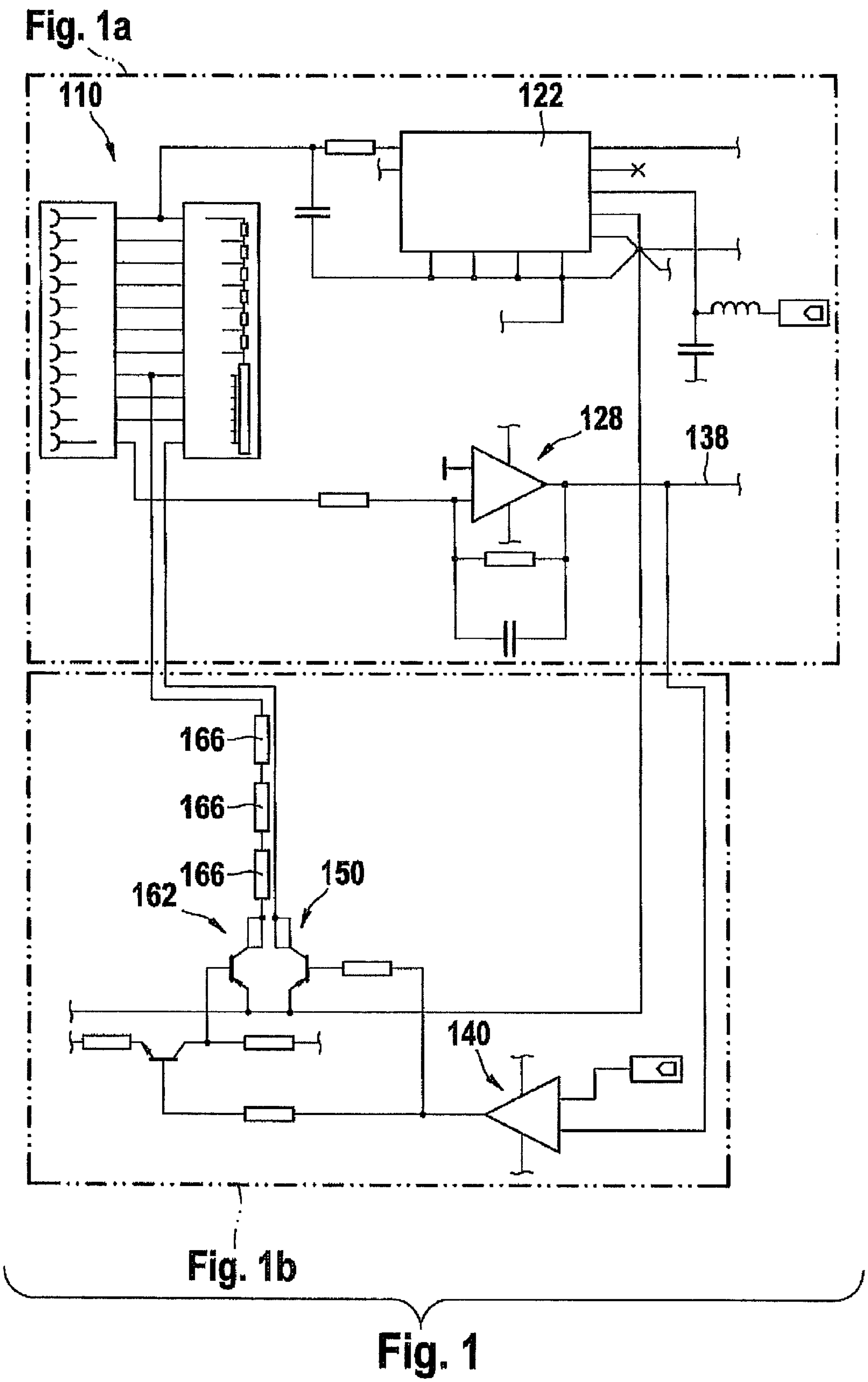
FIG. 1 shows an exemplary embodiment of an electronic circuit for protecting a photomultiplier against overloads in an overall schematic illustration.
Figure 1A:
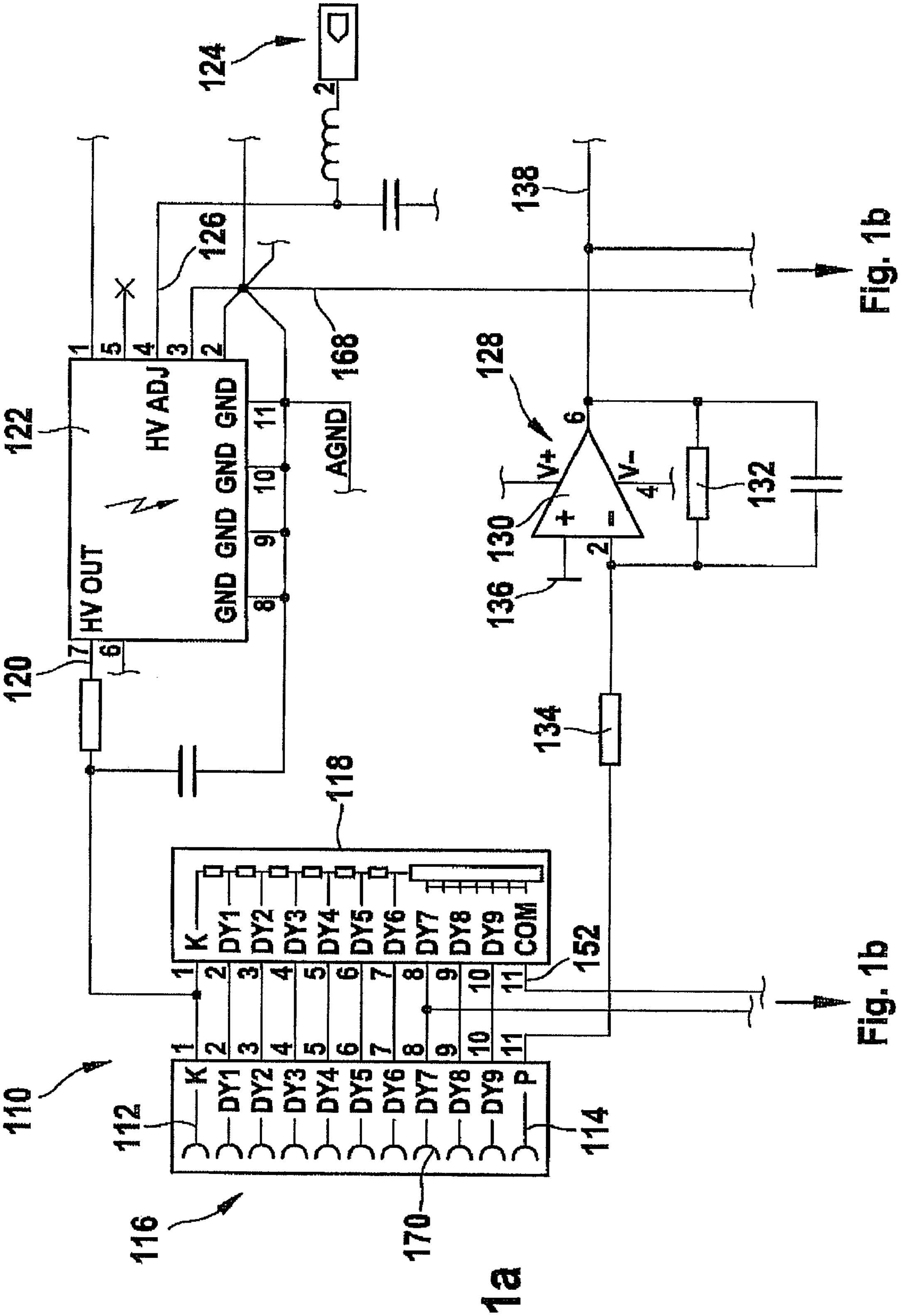
FIG. 1*a* shows a detail illustration of a circuit portion comprising the photomultiplier and a high-voltage source in FIG. 1.
Figure 1B:
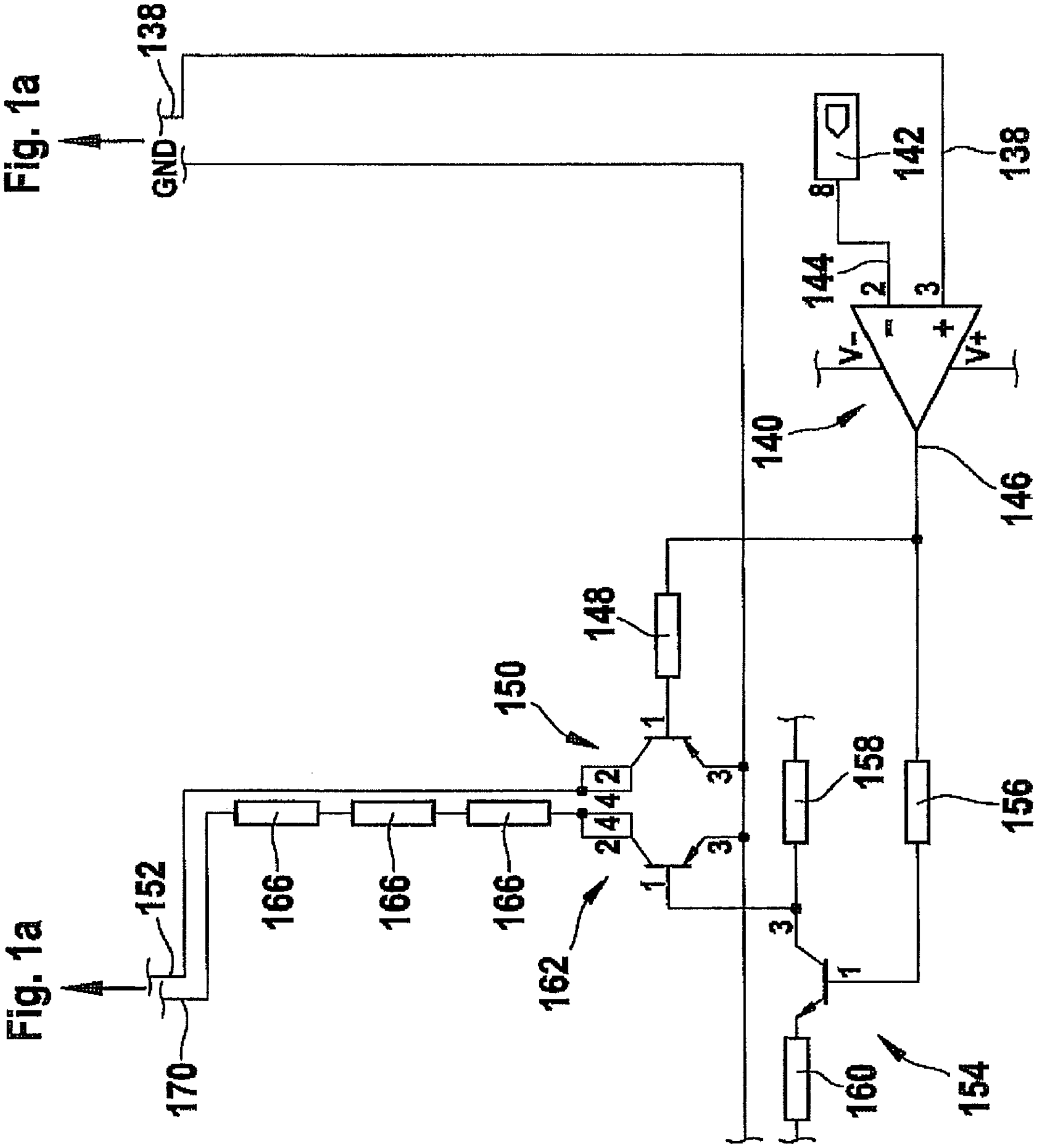
FIG. 1*b* shows a detail illustration of a portion of the circuit comprising a comparison device and a protective circuitry in FIG. 1.

FIGS. 1, 1*a* and 1*b* illustrate an exemplary embodiment of an electronic circuit according to the invention for protecting a photomultiplier 110 against overloads. In this case, FIG. 1 shows an overall illustration of the circuit. FIG. 1*a* shows a detail illustration of a portion of the circuit comprising the photomultiplier 110 and a high-voltage source 122 in FIG. 1. FIG. 1*b* shows a detail illustration of the rest of the circuit in FIG. 1. Reference is made jointly to these figures below.

The circuit can be used for example, as described above, in an optical scanning microscope, for example in order detect light reflected and/or emitted by a sample or else transmitted light that is transmitted through the sample.

Instead of an individual photomultiplier 110, it is also possible to use photomultiplier arrays, for example in conjunction with a spectral splitting of a light, for example in order to be able to measure in different wavelength ranges.

The photomultiplier has (cf FIG. 1*a*) a photocathode 112, an anode 114 and dynodes 116 arranged between photocathode 112 and anode 114. Nine interposed dynodes 116 are provided in this case.

In order to obtain the secondary electron multiplier effect described above, the photomultiplier 110 furthermore has a voltage divider 118. The voltage divider 118 is connected to the dynodes 116, the photocathode 112 and the anode 114 in such a way that the voltage cascade described above can build up at these elements.

The photomultiplier 110 is connected to a high-voltage output 120 (designated by HV Out in FIG. 1*a*) of a high-voltage source 122. The high-voltage source can be set by way of a controllable voltage source in the form of a digital-to-analog converter 124, which is connected to a control input 126 of the high-voltage source 122. The output voltage provided at the high-voltage output 120 can thereby be set. The sensitivity of the photomultiplier 110 is set by the high voltage since the secondary electron multiplication is greatly influenced by the applied high voltage.

On the output side, the anode 114 is connected to a current-voltage converter 128. The latter has an operational amplifier 130, with which a resistor 132 is connected in parallel and a second resistor 134 is connected in series. A second input of the operational amplifier 130 is connected to a ground 136. In this way, a load signal 138 (also referred to as useful signal) is generated from a current signal provided at the anode 114. The load signal 138, which is a measurement signal relative to ground (single-ended), can subsequently be fed to a differential amplifier, for example, in order to generate a differential signal.

At the same time, however, the load signal 138 is passed to a first input of a comparator 140 (cf. FIG. 1*b*). The comparator is in turn configured as an operational amplifier, to the second input of which is connected an adjustable voltage source 142 (once again in the form of a digital-to-analog converter). This digital-to-analog converter 142 supplies a voltage signal corresponding to a predetermined maximum load (maximum load signal 144).

The output signal 146 of the comparator 140 is fed via a resistor 148 to a transistor switch 150, which acts as a protective switch. The transistor switch 150 is switched by the output signal 146 and is connected to a COM port 152 of the voltage divider 118, which is therefore “misused” here as control input.

During normal operation, the transistor switch 150 is closed, such that the end of the voltage divider 118 which is opposite to the high-voltage source 122 is at ground potential. Consequently, the entire high voltage is dropped across the voltage divider 118 during normal operation, and the secondary electron multiplier effect described above can occur. If by contrast, the transistor switch 150 is opened, then the voltage drop at the voltage divider 118 collapses, and the current flow through the anode 114 is interrupted.

At the same time, in the exemplary embodiment illustrated in FIG. 1*b*, the output signal 146 of the comparator 140 is also passed to a load changeover circuit 154. The load changeover circuit 154, which is composed of three resistors 156, 158 and 160, substantially effects an inversion of the output signal 146. The output signal of the load changeover circuit 154 is passed to a bypass switch 162, which is once again a transistor switch.

The bypass switch 162 is arranged in a bypass, which connects the third from last dynode to a ground 168 via three load resistors 166. A positive output signal 146 of the comparator 140 thus brings about, at the same time as a switching of the transistor switch 150, a closing of the bypass switch 162. Consequently, a current can be diverted directly from the third from last dynode, which thus functions as a diverting dynode 170, to the ground 168.

In this case, the three load resistors 166 are dimensioned precisely such that they correspond to the load between the diverting dynode 170 and the anode 114 in the voltage divider 118. Consequently, if the output signal 146 of the comparator 140 switches the two switches 150, 162, that is to say if an overload of the anode 114 occurs, then despite the turn-off of the current through the anode 114, no load change occurs at the high-voltage output 120 of the high-voltage source 122. This load balancing has the effect that, as described above, control processes of the high-voltage source 122 can be avoided.

As described above, a fast turn-off of the photomultiplier 110 can thereby be realized. Furthermore, this not being illustrated in FIGS. 1, 1*a* and 1*b*, the output signal 146 of the comparator 140 can also be fed back to the control input 126 of the high-voltage source 122, and/or to the digital-to-analog converter 124. In this way, a sensitivity of the photomultiplier 110 can be reduced for example in the event of an overload of the photomultiplier 110.

TABLE OF REFERENCE SYMBOLS

110 Photomultiplier
112 Photocathode
114 Anode
116 Dynodes
118 Voltage divider
120 High-voltage output
122 High-voltage source
124 Digital-to-analog converter
126 Control input
128 Current-voltage converter
130 Operational amplifier
132 Resistor

134 Resistor
136 Ground
138 Load signal
140 Comparator
142 Digital-to-analog converter
144 Maximum load signal
146 Output signal of comparator
148 Resistor
150 Transistor switch
152 COM port
154 Load changeover
156 Resistor
158 Resistor
160 Resistor
162 Bypass switch
164 Bypass
166 Load resistors
168 Ground
170 Diverting dynode The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic circuit for protecting a photomultiplier against overloads, the photomultiplier receiving a high voltage from a high voltage source, and having a cathode, an anode, a plurality of dynodes, and a voltage divider, the electronic circuit comprising:

a protective switch operatively configured to prevent a current flow through the anode;

a comparison device operatively configured for comparing a load signal characterizing loading of the anode with a maximum load signal, an output of the comparison device driving the protective switch as a function of the comparison; and wherein the protective switch is set up for acting on a reference potential of the voltage divider.

2. The electronic circuit according to claim 1, further comprising:

at least one bypass switch being connected to a diverting dynode arranged between the cathode and the anode such that, upon actuation of the bypass switch, a current is divertable from the diverting dynode while bypassing the anode.

3. The electronic circuit according to claim 2, wherein at least one further dynode is arranged between the diverting dynode and the anode.

4. The electronic circuit according to claim 2, wherein the circuit is operatively configured for switching the protective switch and the bypass switch in a synchronized manner.

5. The electronic circuit according to claim 4, wherein the circuit switches the protective switch and the bypass switch substantially simultaneously or with a predefined temporal offset.

6. The electronic circuit according to claim 2, wherein the diverted current is diverted via at least one replacement load.

7. The electronic circuit according to claim 6, wherein the replacement load substantially corresponds to a load between the diverting dynode and the anode.

8. The electronic circuit according to claim 1, wherein the load signal is an output signal of the photomultiplier or a signal derived from said output signal.

9. The electronic circuit according to claim 1, wherein the comparison device comprises a comparator.

10. The electronic circuit according to claim 1, further comprising an adjustable voltage source for generating the maximum load signal.

11. The electronic circuit according to claim 1, wherein the high-voltage source is a controlled high-voltage source.

12. A scanning microscope for examining a sample, comprising:

at least one light source for generating at least one microscope beam which acts upon the sample;

at least one scanning device for scanning the sample with the microscope beam;

at least one photomultiplier for detecting light emitted, reflected, and/or transmitted by the sample; and at least one electronic circuit for protecting the photomultiplier against overloads, the photomultiplier being supplied with high voltage via a high voltage source and having a cathode, an anode, a plurality of dynodes and a voltage divider;

wherein the electronic circuit further comprises a protective switch operatively configured to prevent a current flow through the anode;

a comparison device operatively configured for comparing a load signal characterizing loading of the anode with a maximum load signal and driving the protective switch as a function of the comparison; and wherein the protective switch is set up for acting on a reference potential of the voltage divider.

13. A method for protecting a photomultiplier against overloads, the photomultiplier having a cathode, an anode, a plurality of dynodes and a voltage divider, the method comprising the acts of:

applying a high voltage to the photomultiplier via a high voltage source;

comparing a load signal characterizing a loading of the anode with a maximum load signal; and preventing current flow through the anode via a protective switch when the maximum load signal is exceeded, wherein the protective switch is set up for acting on a reference potential of the voltage divider.

14. The method according to claim 13, wherein the current flow through the anode is enabled by the protective switch when the maximum load signal is undershot.

15. The method according to claim 13, wherein upon preventing the current flow through the anode, the current is diverted by a diverting dynode arranged between the cathode and the anode.

16. The method according to claim 15, wherein the current is diverted via a replacement load, wherein the replacement load is chosen such that substantially the same load is present in the case of an interrupted anode current and in the case of a current flow through the anode.

17. The method according to claim 13, wherein an output signal of the photomultiplier or a signal derived from said output signal is used as the load signal.

18. The method according to claim 13, wherein an output signal of a comparison device is used for driving the high-voltage source.

* * * * *